W. Osborn
Pressing
No. 427.
Reissued Feb. 17 1857
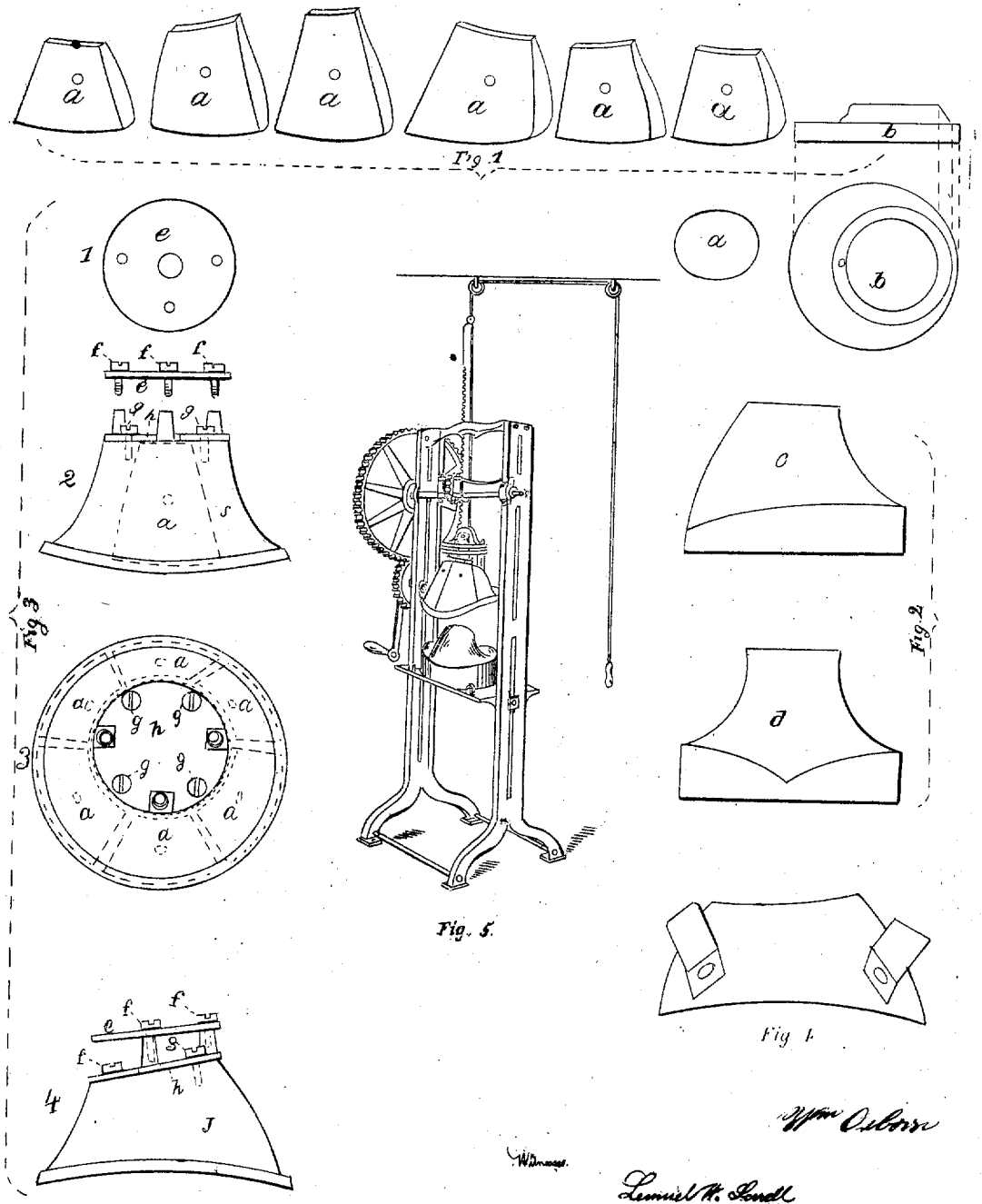
Wm Osborn
Witnesses.
Lemuel W. Lovell
Thomas G. Harold

UNITED STATES PATENT OFFICE.

WILLIAM OSBORN, OF LOUISVILLE, KENTUCKY.

IMPROVEMENT IN MACHINES FOR PRESSING BONNETS AND BONNET-FRAMES.

Specification forming part of Letters Patent No. 15,570, dated August 19, 1856; Reissue No. 427, dated February 17, 1857.

*To all whom it may concern:*

Be it known that I, WILLIAM OSBORN, of the city of Louisville, county of Jefferson, and State of Kentucky, have invented a new and useful means for pressing all kinds of bonnets and pressing and forming buckram frames for bonnets; and I do hereby declare that the following is a full, clear, and exact description of the construction and operation of the same, reference being had to the annexed drawings, making part of this specification, in which—

Figure 5 is a perspective view of the whole machine.

In Fig. 1, *a a a a a a* are heaters, to be placed all around the sides of the upper die. The small heater *a'* is the one that goes on the top of the upper die, to heat the tip of said upper die. *b b'* is the heater for the block or lower die.

In Fig. 2, *c* and *d* are front and side views of the block or lower die.

In Fig. 3, No. I, *e* is a round iron plate attached by screws *f f f* to lugs on top of die J, No. II. The plate *e* has a bolt through the center and is attached by said bolt to a plate at the lower end of the rock-shaft. There are four screws through the plate attached to the lower end of the rock-shaft to adjust the upper die, J. *h* is the top plate, attached by screws *g g g* to the top of the die J, forming the tip of the same, to press the tip of the bonnet or bonnet-frame.

In Fig. 3, No. III is a top view of the plate *h* and die J with heaters. No. IV is a side view showing front and back of upper die, J.

Fig. 4 is the case which covers the heaters of upper die, J.

By changing the dies the above-described apparatus will press all kinds of bonnets and bonnet-frames of every size and shape. The block or lower die may be made of marble or any other material that will not rust from the acid which may be in the bonnets and discolor them. The upper die may be made of cast-iron or other material, so arranged with a rim or flange around the lower edge as to hold heaters all around it to make it hot enough to press bonnets or bonnet-frames, the same dies doing for both. The lower block or die stands upright on an iron bed-plate, and is secured by screws to keep it in place. The bonnet or bonnet-frame is put upon the lower die, and the upper die is lowered on it by the crank, and it is pressed by one impression, or, in other words, is pressed all over at the same time. The bonnet-frame can be made either with the front and side crown in one piece or in two pieces. If in two pieces, they are both formed at once and stuck together at the sides and top at one impression; and in cases where the shape is such that the bonnet-frame can be formed of one piece of material, including the flaring face-piece, side crown, and tip, the same can be pressed in my dies the same as bonnets. On the block or lower die there are two small steel pins about a quarter of an inch in length, made fast to said block. The pins have sharp points and stand vertically in the lower die. When the bonnet-frame is put on the lower die the pins stick through the corners of the frame, and hold the front in place until the tip and side crown are put on the lower die. The upper die is then lowered by means of the crank, (which upper die has two holes in it to receive the pins on the lower die,) and at one impression the frame is made. The result is the same whether the front, side crown, and tip are in one, two, or three pieces. It makes no difference with the machine; it works as well in the one case as in the other.

I do not claim any of the separate parts herein set forth, neither do I claim pressing or forming a separate flaring face-piece or a separate crown piece for bonnets or bonnet-frames; but

What I claim as my invention, and desire to secure by Letters Patent, is—

1. Pressing the whole of a bonnet or bonnet-frame, including the flaring face-piece, side crown, and tip, at one operation by dies, substantially as specified, whether said bonnet or frame be formed of one or of several pieces, and irrespective of the particular shape of the bonnet or frame.

2. Forming the side crown and flaring face-piece of a bonnet-frame in one piece, or at one operation, as specified.

In witness whereof I have hereunto set my signature this 20th day of January, 1857.

WM. OSBORN.

Witnesses:

LEMUEL W. SERRELL,
THOMAS G. HAROLD.